April 8, 1952 E. H. BRADLEY 2,592,237
PUMP STROKE ADJUSTING DEVICE
Filed Jan. 11, 1950
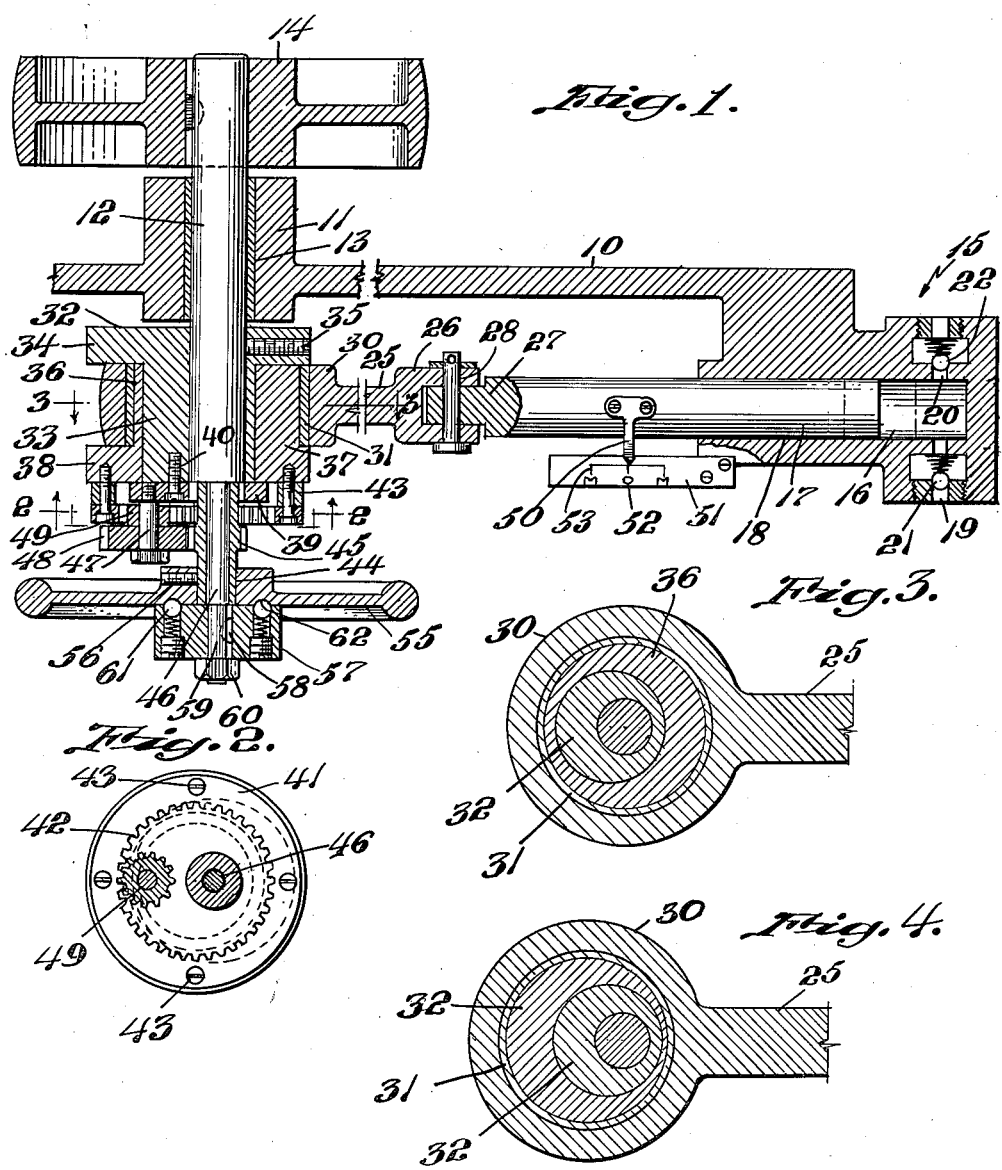
INVENTOR.
Earl H. Bradley
BY
Barlow & Barlow
ATTORNEYS.

Patented Apr. 8, 1952

2,592,237

UNITED STATES PATENT OFFICE 2,592,237

PUMP STROKE ADJUSTING DEVICE

Earl H. Bradley, Seekonk, Mass., assignor to Builders Iron Foundry, a corporation of Rhode Island Application January 11, 1950, Serial No. 138,049

2 Claims. (Cl. 74—571)

This invention relates to an arrangement for adjusting the stroke of a piston such as that found in a positive displacement pump or similar machine.

One of the objects of this invention is to provide a simple mechanism whereby the stroke of a reciprocating element such, for example, as the piston of a pump may be readily adjusted at will from zero to its maximum stroke and this when such element is either active or idle, so that the quantity of fluid discharged each stroke may be varied without stopping the pump.

Another object of this invention is to provide an arrangement for adjusting the stroke where the reciprocating element is connected to a rotating element through a link which swings in the plane of its length as well as providing a movement endwise of its length without any guide for the parts which cause the endwise throw.

With these and other objects in view, the invention consists of certain novel features of construction, as will be more fully described and particularly pointed out in the appended claims.

In the accompanying drawings:

Figure 1 is a sectional view through the stroke adjusting means and showing a pump associated therewith;

Figure 2 is a sectional view on line 2—2 of Figure 1;

Figure 3 is a sectional view on line 3—3 of Figure 1; and

Figure 4 is a view similar to Figure 3 but modified to show the adjustment for maximum stroke.

I have shown this invention as incorporated in connection with a positive displacement pump such as is employed in feeding chemicals, the pump running at substantially constant speed so that the discharge rate is controlled by adjusting the stroke, to change the volume per stroke.

In proceeding with this invention I have provided two eccentric bushings in the connecting rod bearing about a rotary shaft whose relative position may be changed to change the length of stroke of the connecting rod. The adjustment is provided through means of gears to change the relative position of the eccentric bushings, which gears may be operated by a hand wheel which, at the slow pump speed of sixty revolutions or less per minute, may be easily grasped and manipulated while the pump is in operation so as to vary the relative position of the bushings and consequently change the stroke of the reciprocating pump piston.

With reference to the drawings, 10 designates a frame in which there is provided a bearing 11 for rotatably mounting a shaft 12, the bearing being babbited as at 13. A pulley 14 is keyed to the shaft 12 for driving the same by a belt about the pulley.

The pump is designated generally 15 and is located in the frame 10 which provides a cylinder or chamber 16 into which the piston 17 reciprocates, being guided by the walls of the cylinder 18. The size of the chamber 16 is varied thus drawing fluid into the port 19 as the piston 17 is moved to the left in Figure 1 and forcing fluid out of the port 20 as the piston 17 is moved to the right, as shown in Figure 1, these ports 19 and 20 being controlled by ball valves 21 and 22 suitably pressed by springs in one direction to close the ports.

A link or connecting rod 25 has a bifurcated end 26 which receives one end 27 of the piston 17 to which it is pivotally attached by the wrist pin 28 so as to have a rocking movement with reference thereto. The other end of this link or connecting rod is provided with an enlarged bearing 30 encircling the shaft 12 and provided with a babbit surface 31. Between this bearing 30 and the shaft 12, there is provided two eccentric bushings the inner of which 32 has the eccentric body portion 33, and a flange 34, which flange is secured by means of the screw 35 to the shaft 12 so as to rotate therewith. The other eccentric bushing 36 has an eccentric body portion 37 and a flange 38 extending from the end opposite the end of the inner eccentric bushing 32. The eccentric portion of this outer bushing fits within the babbit or bearing 31 of the bearing 30 and both eccentric body portions telescope together.

A washer or plate 39 is secured to the inner eccentric bushing by screws 40 and is of a diameter to extend over the end of the outer eccentric bushing 36 so that endwise motion of these bushings is prevented. The relative rotation of the bushings, however, may occur.

In order to provide a means for relatively rotating the two eccentric bushings, I have provided a ring gear 41 having internal teeth 42 which is fixed to the outer bushing 36 by means of screws 43. I have provided a sleeve 44, on which there is formed as one piece therewith a gear 45 to rotate upon a reduced portion 46 of the shaft 12. A shaft 47 is secured to the plate 39 and on this shaft there is mounted two gears fixed together, one of which 48 meshes with the gear 45 and the other of which 49 meshes with the ring gear 42. Thus, if we assume the shaft 12 and the bushing 32 which is fixed thereto stationary and rotate the gear 45 about the shaft 46 as an axis, motion will be transmitted to the gear 48 and gear 49 which turns with it about the shaft 47 to rotate the ring gear to move the outer eccentric bushing about the inner eccentric bushing 32 until the desired relative position of the two bushings is obtained. As shown in Figure 3, the eccentrics are oppositely located so that no motion will occur; while in Figure 4, the eccentrics are both located at the same side of the center of the shaft so that a maximum stroke will occur or an intermediate position may be had if desired.

By placing a pointer 50 upon the piston 17 and providing a datum designation 51, I may indicate a zero position 52 and a maximum throw position M or 53, the pointer 50 being illustrated as now set at a no motion position; whereas, if the pointer were at the datum line M, a maximum stroke would then be provided.

In order to easily operate the adjusting mechanism, a hand wheel 55 is secured by screw 56 to the sleeve 44 which is rotatable on the reduced portion of the shaft 46. A casing 57 is keyed as at 58 to a further reduced portion 59 of the shaft and is held in position against the shoulder between this reduced portion and the portion 46 by a nut 60. This casing carries spring pressed balls 61 which may fit into recesses 62 in the wheel, so that the wheel and casing and shaft will turn together unless there is provided a sufficient resistance to cause the balls to move inwardly out of their sockets.

If the pump is operating, all of the parts within the bearing 30 will be turning with the shaft 12. Should it be desired to adjust the relative position of the eccentric bushings, it is merely necessary to grasp the hand wheel for a sufficient length of time so that the eccentrics become adjusted to cause the desired throw of the connecting rod, or if it is desired the hand wheel may be rotated faster than the rotation of the shaft 12 to accomplish a similar adjustment of the eccentrics. In pumps of this positive displacement type which are used for feeding chemicals as the rotation is sixty revolutions per minute or less, either means of accomplishing this adjustment may be readily had.

I claim:

1. A stroke adjusting mechanism comprising a rotary shaft, an eccentric secured to said shaft to rotate therewith, a second eccentric rotatably mounted on said first eccentric, reciprocating stroke transmitting means embracing said second eccentric, gear means between said eccentrics for relatively adjusting said eccentrics to vary the stroke of said means including a gear coaxial with said shaft, and a gear meshing therewith and rotatable about an axis fixed to said inner eccentric to rotate said outer eccentric relative thereto.

2. A stroke adjusting mechanism comprising a rotary shaft, an eccentric secured to said shaft to rotate therewith, a second eccentric rotatably mounted on said first eccentric, reciprocating stroke transmitting means embracing said second eccentric, gear means between said eccentrics for relatively adjusting said eccentrics to vary the stroke of said means including a gear coaxial with said shaft, a ring gear with internal teeth fixed to said outer eccentric, and gears rotatable about an axis fixed to the inner eccentric and connecting said gear coaxial with said shaft and ring gear.

EARL H. BRADLEY.

REFERENCES CITED

The following references are of record in the file of this patent:

UNITED STATES PATENTS

| Number | Name | Date |
| --- | --- | --- |
| 421,297 | Mills | Feb. 11, 1890 |
| 540,394 | Leitch | June 4, 1895 |
| 2,477,587 | Doutt | Aug. 2, 1949 |